US010169893B2

(12) United States Patent
Diverdi et al.

(10) Patent No.: US 10,169,893 B2
(45) Date of Patent: *Jan. 1, 2019

(54) OPTIMIZING PHOTO ALBUM LAYOUTS

(71) Applicant: Google LLC, Mountain View, CA (US)

(72) Inventors: Stephen Joseph Diverdi, Oakland, CA (US); Ohad Izhak Fried, Princeton, NJ (US)

(73) Assignee: Google LLC, Mountain View, CA (US)

( * ) Notice: Subject to any disclaimer, the term of this patent is extended or adjusted under 35 U.S.C. 154(b) by 56 days.

This patent is subject to a terminal disclaimer.

(21) Appl. No.: 15/242,791

(22) Filed: Aug. 22, 2016

(65) Prior Publication Data

US 2016/0371867 A1    Dec. 22, 2016

Related U.S. Application Data

(63) Continuation of application No. 14/018,365, filed on Sep. 4, 2013, now Pat. No. 9,424,671.

(51) Int. Cl.
*G06K 9/00* (2006.01)
*G06T 11/60* (2006.01)
*G06T 11/20* (2006.01)

(52) U.S. Cl.
CPC ............ *G06T 11/60* (2013.01); *G06T 11/206* (2013.01)

(58) Field of Classification Search
CPC ............ G06F 17/30247; G06F 17/212; G06F 17/30061; G06F 17/30259; G06F 17/30277; G06F 17/30554; G06F 17/30598; G06F 17/3087; G06F 17/30994; H04N 1/00196; H04N 1/00161; G06K 9/48; G06K 9/6215; G06K 9/00288; G06K 9/00362; G06K 9/00664; G06K 9/6224

See application file for complete search history.

(56) References Cited

U.S. PATENT DOCUMENTS

| | | | |
|---|---|---|---|
| 6,879,728 B1 | 4/2005 | Fisher et al. | |
| 7,656,543 B2 | 2/2010 | Atkins | |
| 7,920,745 B2 | 4/2011 | Song et al. | |
| 8,352,465 B1 | 1/2013 | Jing et al. | |
| 8,401,312 B2 | 3/2013 | Chertok et al. | |
| 2006/0140455 A1* | 6/2006 | Costache | G06F 17/30259 382/118 |
| 2006/0279555 A1 | 12/2006 | Ono | |
| 2006/0279566 A1 | 12/2006 | Atkins | |

(Continued)

OTHER PUBLICATIONS

Li et al, "A grid layout algorithm for automatic drawing of biochemical networks", 2005.

(Continued)

*Primary Examiner* — Brian Werner
*Assistant Examiner* — Ian L Lemieux
(74) *Attorney, Agent, or Firm* — IP Spring

(57) ABSTRACT

Implementations generally relate to optimizing a photo album layout. In some implementations, a method includes receiving a plurality of images and determining a target arrangement. The method also includes arranging the plurality of images in an N-dimensional arrangement based on a predetermined distance function. The method also includes arranging the plurality of images in the target arrangement based on the N-dimensional arrangement.

20 Claims, 11 Drawing Sheets

(56) References Cited

U.S. PATENT DOCUMENTS

| | | | |
|---|---|---|---|
| 2010/0158412 A1* | 6/2010 | Wang | G06K 9/00624 |
| | | | 382/305 |
| 2011/0110587 A1 | 5/2011 | Banner | |
| 2012/0206771 A1 | 8/2012 | Cok | |
| 2013/0055055 A1* | 2/2013 | Turcotte | G06F 9/4443 |
| | | | 715/201 |
| 2013/0088517 A1 | 4/2013 | McKenna et al. | |
| 2014/0164913 A1 | 6/2014 | Jaros et al. | |
| 2014/0169684 A1 | 6/2014 | Samii et al. | |
| 2014/0304278 A1 | 10/2014 | Kleiman et al. | |

OTHER PUBLICATIONS

Chen et al, "Similarity-based image browsing", 2000.
Zhen Tang, "Color harmonization for image", J. Electron. Imaging. 20(2), 023001 (Apr. 13, 2011).
Yan, Shuicheng, et al., "Graph Embedding: a General Framework for Dimensionality Reduction", IEEE Computer Society Conference on Computer Vision and Pattern Recognition, CVPR 2005, vol. 2, pp. 830-837, 2005.

* cited by examiner

400

800

OPTIMIZING PHOTO ALBUM LAYOUTS

RELATED APPLICATIONS

This application is a continuation of, and claims priority to, U.S. patent application Ser. No. 14/018,365, filed Sep. 4, 2013, the contents of which are incorporated herein by reference in their entirety.

BACKGROUND

Social network systems often enable users to upload media content such as photos, and enable users to create photo albums. Social network systems also enable users to share photos with each other. For example, users can share photos with friends and family, which provides enjoyable and bonding experiences among users of a social network system. Photos in a photo album are often ordered in chronological order. Photos can also be grouped into categories using multiple photo albums, where each photo album is associated with a different category.

SUMMARY

Implementations generally relate to optimizing photo album layouts. In some implementations, a method includes receiving a plurality of images and determining a target arrangement. The method further includes arranging the plurality of images in an N-dimensional arrangement based on a predetermined distance function. The method further includes arranging the plurality of images in the target arrangement based on the N-dimensional arrangement.

With further regard to the method, in some implementations, the method further includes harmonizing color of the images in the target arrangement. In some implementations, the target arrangement is a discrete grid having a set of discrete N-dimensional cells. In some implementations, the predetermined distance function is based on one or more of color and content. In some implementations, the predetermined distance function is based on similarity. In some implementations, the arranging of the plurality of images in the N-dimensional arrangement includes generating a distance graph based on the plurality of images; and embedding the distance graph onto an N-dimensional arrangement. In some implementations, the arranging of the plurality of images in the N-dimensional arrangement includes: determining pairwise distances between each pair of images of the plurality of images based on the predetermined distance function; generating a distance graph based on the pairwise distances; and embedding the distance graph onto an N-dimensional arrangement. In some implementations, the method further includes determining a coarse alignment of the N-dimensional arrangement of the images and the target arrangement, where the arranging of the plurality of images in the target arrangement is based on the coarse alignment. In some implementations, the arranging of the plurality of images in the target arrangement includes: determining a coarse alignment of the N-dimensional arrangement of the images and the target arrangement; generating a bipartite graph based on the coarse alignment; computing a minimal bijection of the bipartite graph; and arranging the plurality of images in the target arrangement based on the minimal bijection.

In some implementations, a method includes receiving a plurality of images, and determining a target arrangement, where the target arrangement is a discrete grid having a set of discrete N-dimensional cells. The method further includes arranging the plurality of images in an N-dimensional arrangement based on a predetermined distance function, where the predetermined distance function is based on one or more of color and content, and where the arranging of the plurality of images in the N-dimensional arrangement includes: generating a distance graph based on the plurality of images; and embedding the distance graph onto an N-dimensional arrangement. The method further includes arranging the plurality of images in the target arrangement based on the N-dimensional arrangement.

With further regard to the method, in some implementations, the method further includes harmonizing color of the images in the target arrangement. In some implementations, the method further includes determining a coarse alignment of the N-dimensional arrangement of the images and the target arrangement, where the arranging of the plurality of images in the target arrangement is based on the coarse alignment. In some implementations, the arranging of the plurality of images in the target arrangement includes: determining a coarse alignment of the N-dimensional arrangement of the images and the target arrangement; generating a bipartite graph based on the coarse alignment; computing a minimal bijection of the bipartite graph; and arranging the plurality of images in the target arrangement based on the minimal bijection.

In some implementations, a system includes one or more processors, and logic encoded in one or more tangible media for execution by the one or more processors. When executed, the logic is operable to perform operations including: receiving a plurality of images; determining a target arrangement; arranging the plurality of images in an N-dimensional arrangement based on a predetermined distance function; and arranging the plurality of images in the target arrangement based on the N-dimensional arrangement.

With further regard to the system, in some implementations, the logic when executed is further operable to perform operations including harmonizing color of the images in the target arrangement. In some implementations, the target arrangement is a discrete grid having a set of discrete N-dimensional cells. In some implementations, the predetermined distance function is based on one or more of color and content. In some implementations, the predetermined distance function is based on similarity. In some implementations, to arrange the plurality of images in the N-dimensional arrangement, the logic when executed is further operable to perform operations including: generating a distance graph based on the plurality of images; and embedding the distance graph onto an N-dimensional arrangement. In some implementations, to arrange the plurality of images in the N-dimensional arrangement, the logic when executed is further operable to perform operations including: determining pairwise distances between each pair of images of the plurality of images based on the predetermined distance function; generating a distance graph based on the pairwise distances; and embedding the distance graph onto an N-dimensional arrangement.

DETAILED DESCRIPTION

Implementations described herein optimize photo album layouts. In various implementations, a system receives images and determines a target arrangement for the images. In some implementations, the target arrangement may be a discrete grid having a set of discrete N-dimensional cells. The system then arranges the images in an N-dimensional arrangement based on a predetermined distance function. The system then arranges the images in the target arrangement based on the N-dimensional arrangement.

In some implementations, the predetermined distance function is based on one or more of color, content, similarity, and a histogram. In some implementations, the arranging of the images in the N-dimensional arrangement may include the system generating a distance graph based on the images and embedding the distance graph onto an N-dimensional arrangement (e.g., 1-dimensional line, 2-dimensional plane, 3-dimensional volume, etc.). In some implementations, the arranging of the images in the N-dimensional arrangement may include determining pairwise distances between each pair of images based on the predetermined distance function, generating a distance graph based on the pairwise distances, and embedding the distance graph onto an N-dimensional arrangement.

In some implementations, the system determines a coarse alignment of the N-dimensional arrangement and the target arrangement, where the arranging of the images in the target arrangement is based on the coarse alignment. In some implementations, the arranging of the images in the target arrangement may include determining a coarse alignment of the N-dimensional arrangement and the target arrangement, generating a bipartite graph based on the coarse alignment, computing a minimal bijection of the bipartite graph, and arranging the images in the target arrangement based on the minimal bijection. In various implementations, the system harmonizes the color of the images in the target arrangement. For example, in some implementations, system 102 may harmonize the colors by modifying various color aspects of a given image to harmonize with corresponding color aspects of each of the adjacent images. Such color aspects may include one or more of hue, shades, tints, tones, value, saturation, luminance, chromaticity, etc. Such color harmonization of images provides a more aesthetically pleasing image layout for users.

Figure 1:
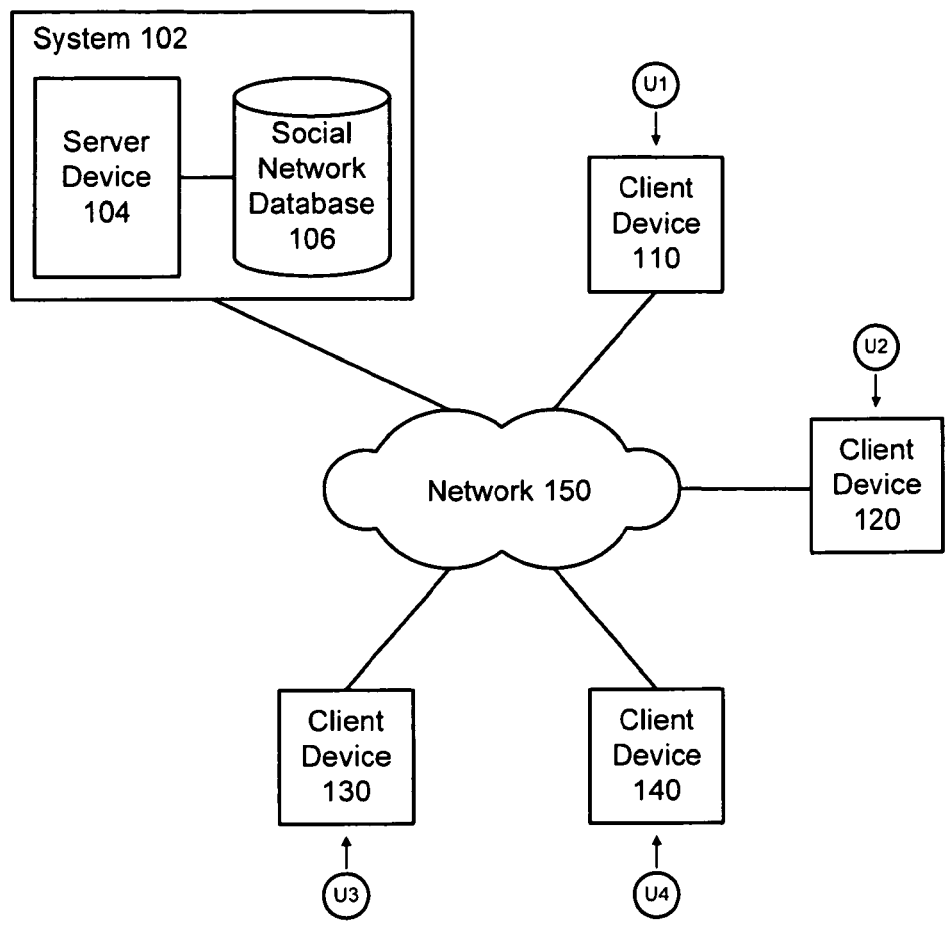
FIG. 1 illustrates a block diagram of an example network environment, which may be used to implement the implementations described herein.

FIG. 1 illustrates a block diagram of an example network environment 100, which may be used to implement the implementations described herein. In some implementations, network environment 100 includes a system 102, which includes a server device 104 and a social network database 106. In various implementations, the term system 102 and phrase "social network system" may be used interchangeably. Network environment 100 also includes client devices 110, 120, 130, and 140, which may communicate with each other via system 102. Network environment 100 also includes a network 150.

For ease of illustration, FIG. 1 shows one block for each of system 102, server device 104, and social network database 106, and shows four blocks for client devices 110, 120, 130, and 140. Blocks 102, 104, and 106 may represent multiple systems, server devices, and social network databases. Also, there may be any number of client devices. In other implementations, network environment 100 may not have all of the components shown and/or may have other elements including other types of elements instead of, or in addition to, those shown herein.

In various implementations, users U1, U2, U3, and U4 may communicate with each other using respective client devices 110, 120, 130, and 140. For example, users U1, U2, U3, and U4 may upload photos to system 102 using respective client devices 110, 120, 130, and 140 transmit media streams to each other.

In the various implementations described herein, the processor of system 102 causes the elements described herein (e.g., photos, photo album layouts, etc.) to be displayed in a user interface on a display screen.

In various implementations, system 102 may utilize a recognition algorithm to determine if content (e.g., a person) is the same in a group of photos. Example implementations of recognition algorithms are described in more detail below.

While some implementations are described herein in the context of a social network system, these implementations may apply in contexts other than a social network. For example, implementations may apply locally for an individual user. For example, system 102 may perform the implementations described herein on a stand-alone computer.

Figure 2:
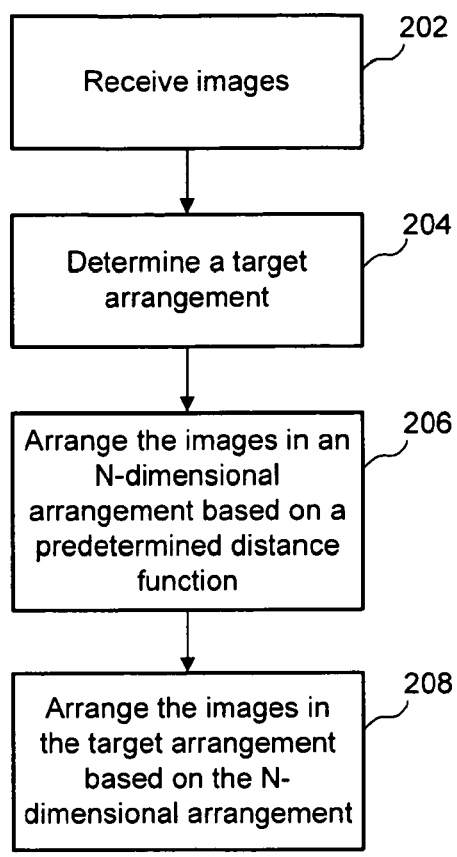
FIG. 2 illustrates an example simplified flow diagram for optimizing a photo album layout, according to some implementations.

FIG. 2 illustrates an example simplified flow diagram for optimizing a photo album layout, according to some implementations. Referring to both FIGS. 1 and 2, a method is initiated in block 202, where system 102 receives images. In various implementations, the photos may be received when the user uploads the images to system 102 or after the user adds the images to one or more photo albums. In some implementations, system 102 may enable a camera device (e.g., smart phone) of the user to automatically upload images to system 102 as the camera device captures photos.

Figure 3:
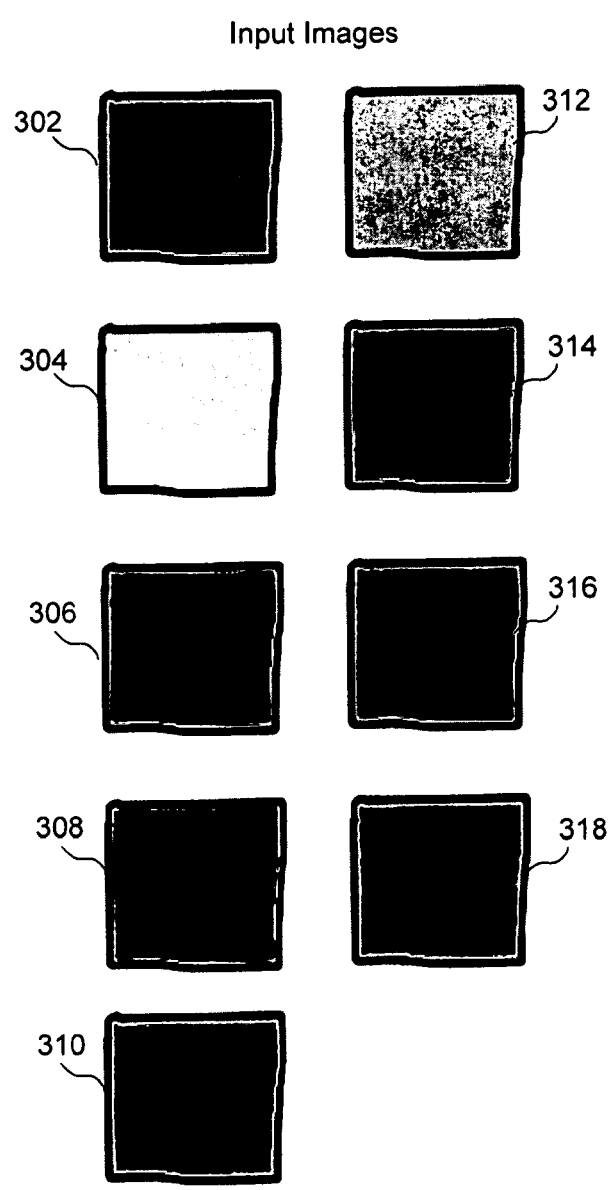
FIG. 3 illustrates an example set of simplified input images, according to some implementations.

FIG. 3 illustrates an example set of simplified input images 302, 304, 306, 308, 310, 312, 314, 316, and 318, according to some implementations. For simplification and ease of illustration, images 302-318 are represented by different colors. In various implementations, a given color may represent a dominant color in a given image. In various implementations, any of the images 302-318 may include any variety of color variations and content.

In block 204, system 102 determines a target arrangement. In various implementations, the target arrangement is an arrangement of images that is optimized for the user. For example, as described in more detail below, the target arrangement may be optimized in that it is made more useful to a user (e.g., easier to view images) and/or more pleasing to a user (e.g., images arranged based on color and/or images color harmonized for more pleasant viewing of images).

Figure 4:
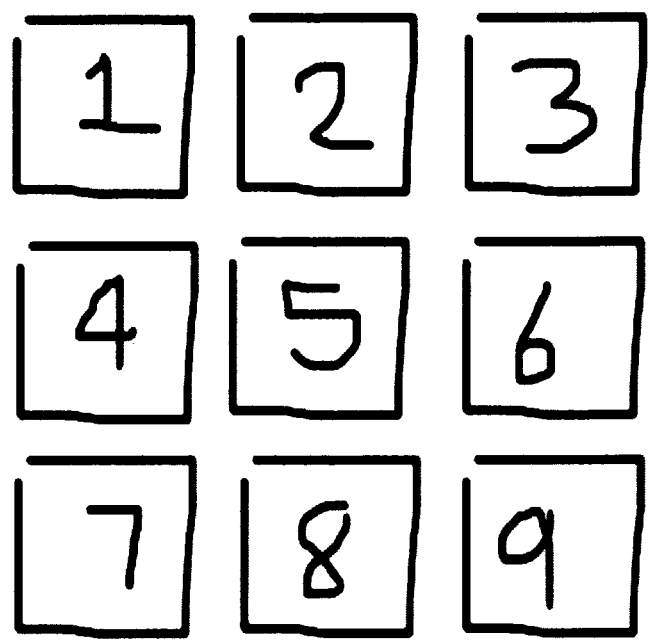
FIG. 4 illustrates an example simplified target arrangement, according to some implementations.

FIG. 4 illustrates an example simplified target arrangement 400, according to some implementations. In various implementations, target arrangement 400 may be a discrete grid. As shown, in some implementations, target arrangement 400 is a discrete grid having a set of discrete N-dimensional cells (labeled "1" through "9"). Target arrangement 400 may be any desired grid arrangement such as an N×M 2D rectangular grid as shown, but may also be other arrangements including any arbitrary set of discrete, N-dimensional points (e.g., arranged in a circle shape, triangle shape, or more complex such as a heart shape, a ring shape, etc.).

In block 206, system 102 arranges the images in an N-dimensional arrangement based on a predetermined distance function. In various implementations, the predetermined distance function is used to compute "distances" between each pair of images based on some various attributes (e.g., histogram difference, color similarity, similar content, etc.). As described in more detail below, system 102 arranges images into a 2-dimensional (2D) arrangement and ultimately into a dense, discrete grid, such that the image distances on the grid optimally correspond to the pairwise distances among the images. For ease of illustration, some implementations are described herein in the context of 2D arrangements. These implementations also apply to any N-dimensional arrangements (e.g., 1-dimensional arrangements, 3-dimensional arrangements, etc.).

In various implementations, the predetermined distance function may be based on one or more of color and content. In some implementations, the predetermined distance function is based on similarity. For example, the predetermined distance may be based on color similarity, content similarity, etc. In some implementations, the predetermined distance function is based on a histogram. For example, in some implementations, the predetermined distance may be an image histogram difference, color histogram difference, etc.

Figure 5:
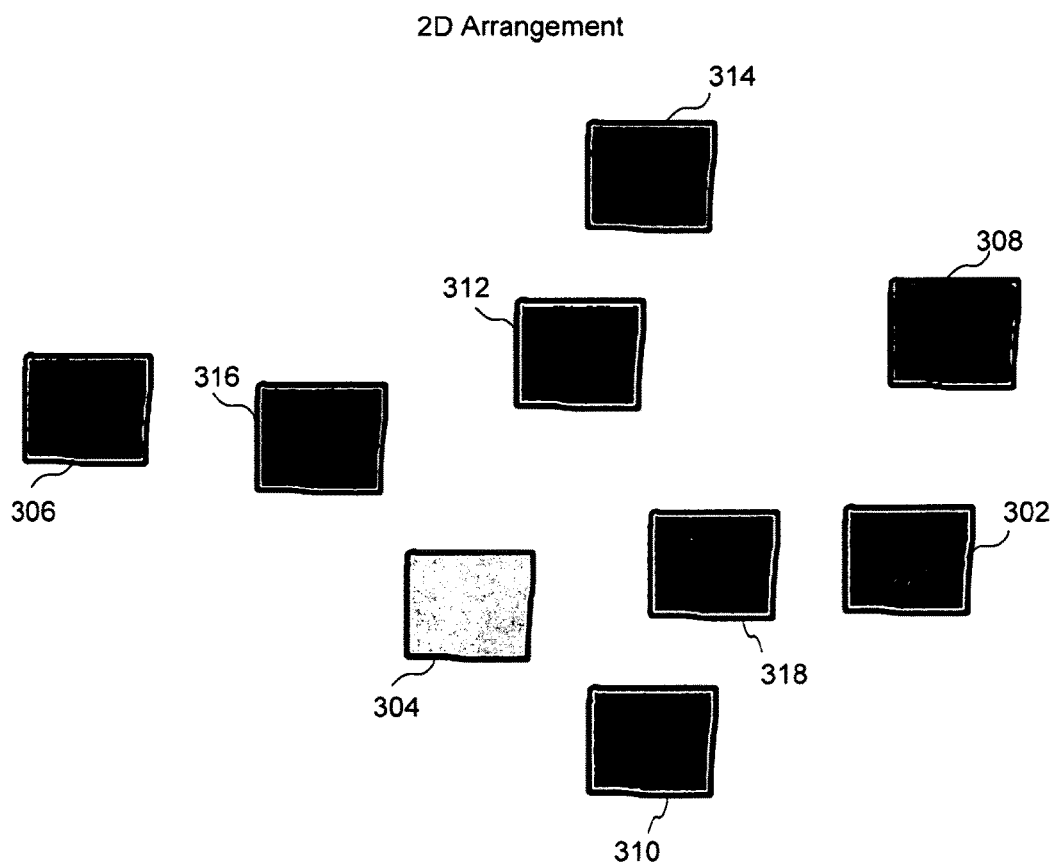
FIG. 5 illustrates an example simplified 2-dimensional (2D) arrangement, according to some implementations.

FIG. 5 illustrates an example simplified 2D arrangement 500, according to some implementations. 2D arrangement 500 includes images 302-318 of FIG. 3 arranged in a 2D pattern. In some implementations, to arrange the images (e.g., images 302-318) in 2D arrangement 500, system 102 generates a distance graph based on the images, and then embeds the distance graph onto a 2D plane (e.g., 2D arrangement 500). In various implementations, embedding a distance graph onto an N-dimensional arrangement may mean generally to find some mapping of a grid into an N-dimensional (euclidean) space, through a variety of means that may be projection, unrolling, mapping, etc. In some implementations, the 2D arrangement is a continuous arrangement. For ease of illustration, some implementations are described herein in the context of 2D arrangements. These implementations may also apply to other N-dimensional arrangements such as 1-dimensional lines, 3-dimensional volumes, etc.).

In some implementations, to arrange the images in a 2D arrangement 500, system 102 determines pairwise distances between each pair of images of the set of images (e.g., images 302-318) based on the predetermined distance function. In this particular example, the predetermined distance function is based on color. System 102 then generates a distance graph based on the pairwise distances.

In various implementations, the predetermined distance function may be based on various color aspects such as hue, shades, tints, tones, value, saturation, luminance, chromaticity, etc.

Figure 6:
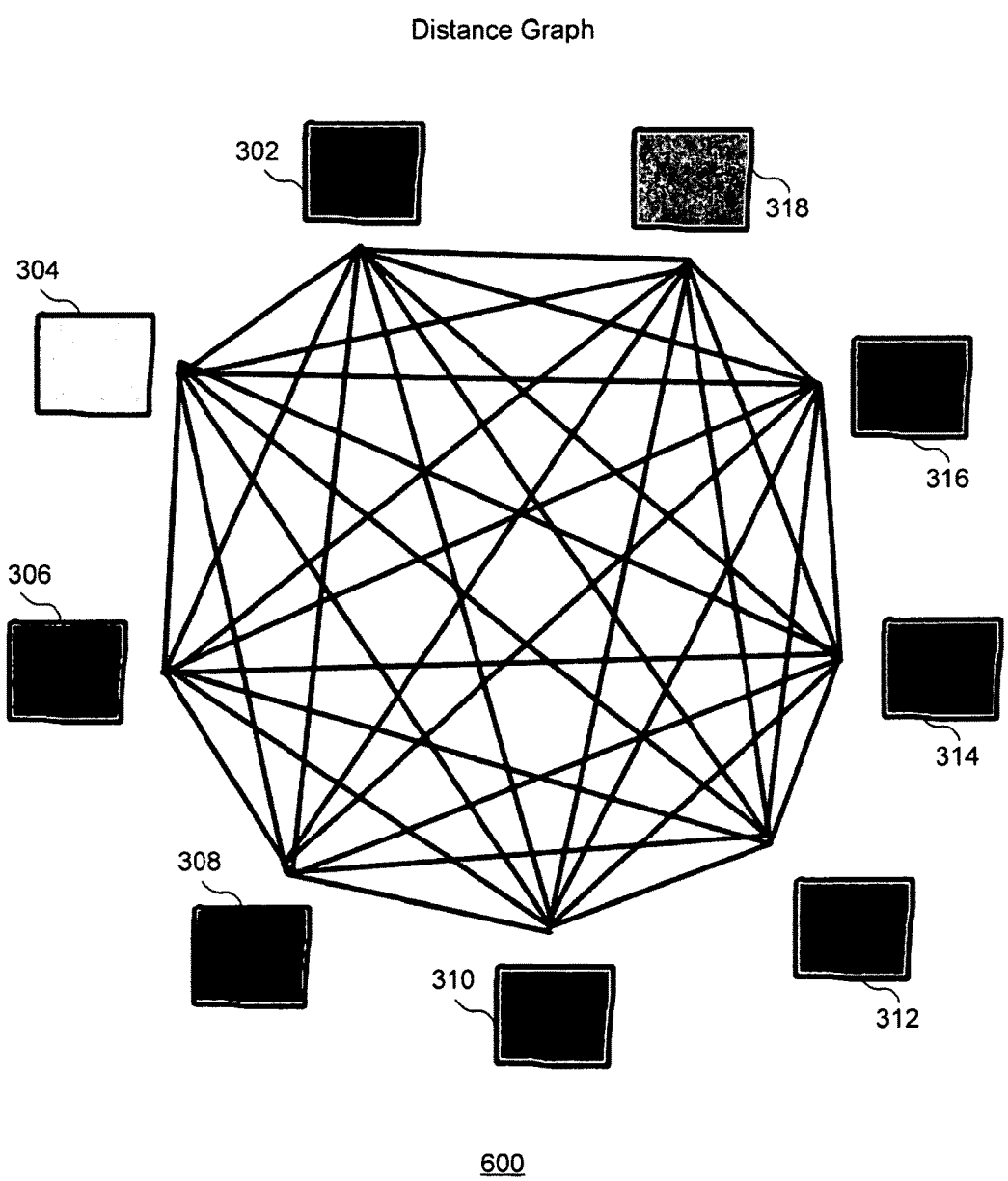
FIG. 6 illustrates an example distance graph, according to some implementations.

FIG. 6 illustrates an example distance graph 600, according to some implementations. As shown, in this example, distance graph 600 is based on color similarity. System 102 then embeds the distance graph onto a 2D plane (e.g., 2D arrangement 500).

In various implementations, for a given distance function, system 102 computes pairwise distances of the images. This creates distance graph 600, where distance graph 600 has vertices and edges, where each vertex corresponds to an image of the images, and where each edge joining two vertices has a weight corresponding to a distance between the two images. In some implementations, distance graph 600 is fully connected such that for S vertices, there are $S^2$ edges.

For example, referring again to FIG. 5, the distance between to two images having a similar color (e.g., green images 304, 310, 318, etc.) is close (e.g., low distance/high similarity) and may have a corresponding low weight. Conversely, the distance between to two images having dissimilar colors (e.g., red image 316 and blue image 302) is far (e.g., high distance/low similarity) and may have a corresponding high weight.

In some implementations, the images may be arranged in 2D arrangement 500 such that similar images (e.g., with small distances) are nearer to each other and dissimilar images (e.g., with large distances) are farther from each other. As such, system 102 may group green images (e.g., images 304, 310, 318, etc.) nearer to each other, as shown in FIG. 5. As such, system 102 may group red images (e.g., images 316, 312, etc.) further apart from blue images (e.g., images 302, 308, etc.), as shown in FIG. 5.

In some implementations, the images may be arranged in 2D arrangement 500 such that images with color palettes that meet a predetermined similarity threshold are nearer to each other. For example, in some implementations, a predetermined similarity threshold may include items being of the same or similar color. As such, system 102 may group green images (e.g., 304, 310, 318, etc.) nearer to each other, as shown in FIG. 5.

In some implementations, images with different color palettes that meet a predetermined difference threshold are further apart from each other. For example, a predetermined difference threshold may include items being of different or dissimilar colors. As such, system 102 may group red images (e.g., 316, 312, etc.) further apart from blue images (e.g., 302, 308, etc.), as shown in FIG. 5.

In various implementations, system 102 may embed the distance graph onto the 2D plane using any suitable algorithms such as non-linear dimensionality reduction (NLDR) algorithms, which may include, for example, algorithms such as multidimensional scaling (MDS), isometric feature mapping (ISOMAP), locally linear embedding (LLE), and manifold sculpting algorithms, as well as linear algorithms such a principal component analysis (PCA) algorithm.

Referring still to FIG. 2, in block 208, system 102 arranges the images in the target arrangement based on the 2D arrangement.

Figure 7:
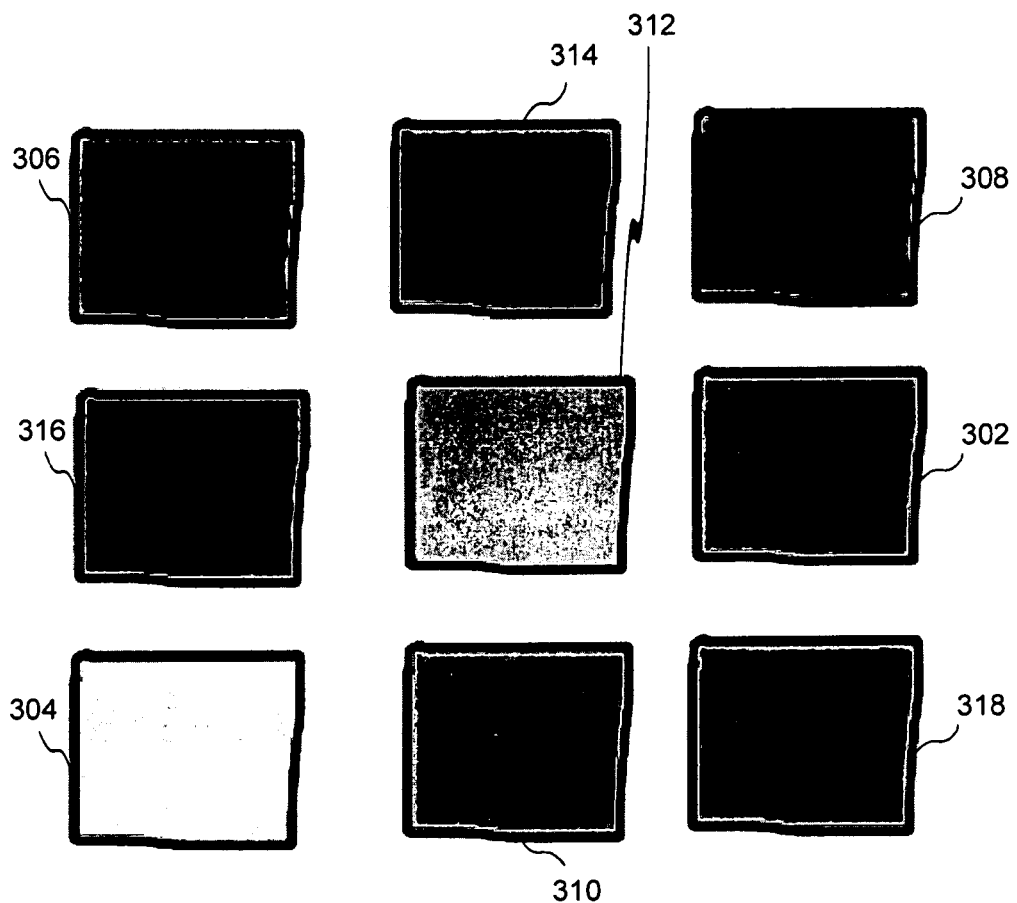
FIG. 7 illustrates an example resulting target arrangement, according to some implementations.

FIG. 7 illustrates an example resulting target arrangement 700, according to some implementations. As shown, images having similar colors such as green images 304, 310, 318, etc. are nearer to each other, and are positioned in corresponding positions in the target arrangement. Also, images having different colors such as red images e.g., 316, 312, etc. and blue images e.g., 302, 308, etc. are positioned further apart from to each other, and are positioned in corresponding positions in the target arrangement.

As described in more detail below in connection with FIG. 8, in some implementations, system 102 determines a coarse alignment of the 2D arrangement of the images and the target arrangement, where the arranging of the images in the target arrangement is based on the coarse alignment of the 2D arrangement. As a result, the 2D arrangement of the images and the target arrangement cover roughly the same space.

Figure 8:
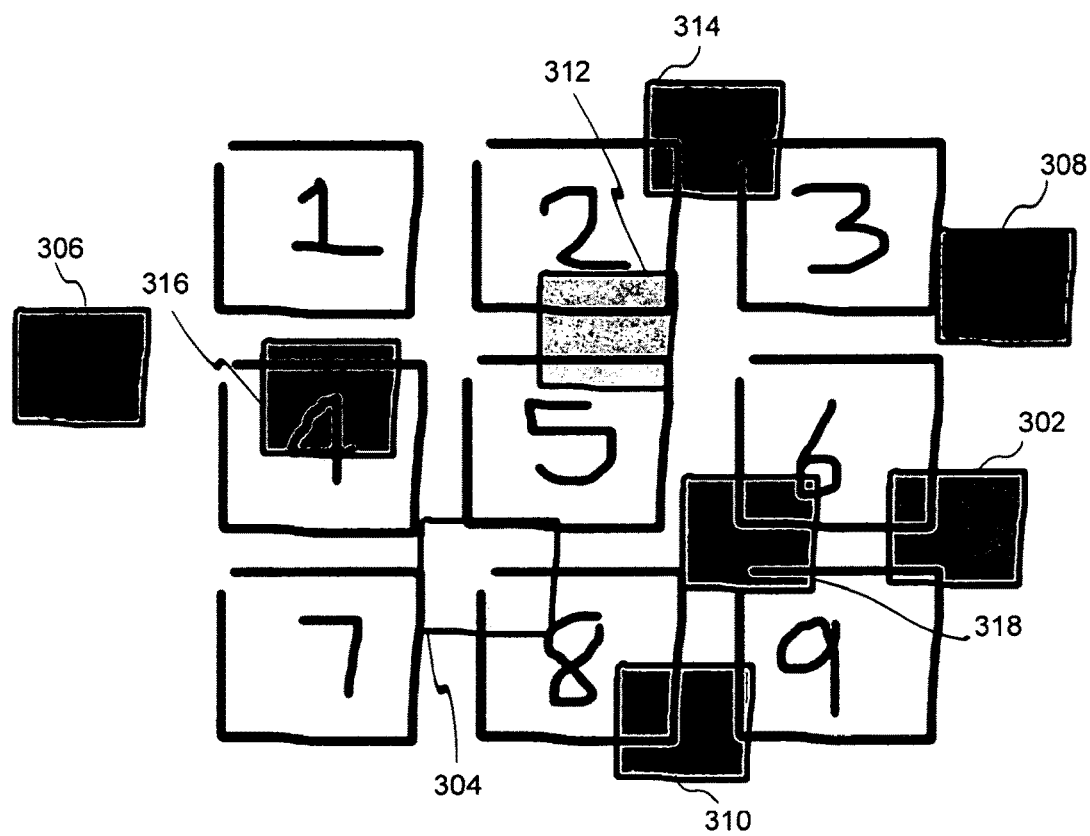
FIG. 8 illustrates an example diagram showing a coarse alignment, according to some implementations.

FIG. 8 illustrates an example diagram showing a coarse alignment 800, according to some implementations. In some implementations, to arrange the images in the target arrangement, system 102 determines coarse alignment 800 of the 2D arrangement of the images and the target arrangement. System 102 then generates a bipartite graph based on the coarse alignment. Example implementations directed to a bipartite graph are described in more detail below in connection with FIG. 9. System 102 then computes a minimal bijection of the bipartite graph. Example implementations directed to a minimal bijection are described in more detail below in connection with FIG. 10. System 102 then arranges the images in the target arrangement based on the minimal bijection.

Figure 9:
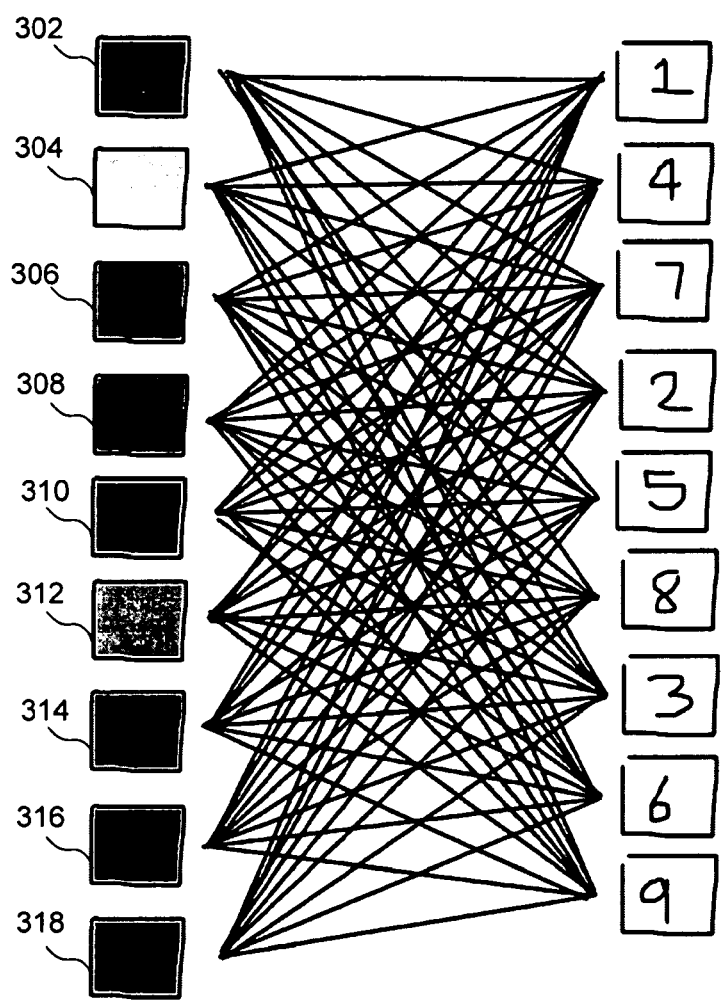
FIG. 9 illustrates an example diagram showing a bipartite graph, according to some implementations.

FIG. 9 illustrates an example diagram showing a bipartite graph 900, according to some implementations. In some implementations, system 102 generates bipartite graph based on pairwise distances between each image and each location in the target arrangement.

In some implementations, the bipartite graph includes a set U of vertices and a set V of vertices. Set U includes a vertex for each image and set V has a vertex for each grid cell in the target arrangement. Also, every vertex in set U is connected by an edge to every vertex in set V. In various implementations, each edge has a weight based on a Euclidean distance between a 2D embedding of the image vertex and a 2D position of the grid cell. In some implementations, a given edge weight equals the distance between to vertices/images connected by the edge.

Figure 10:
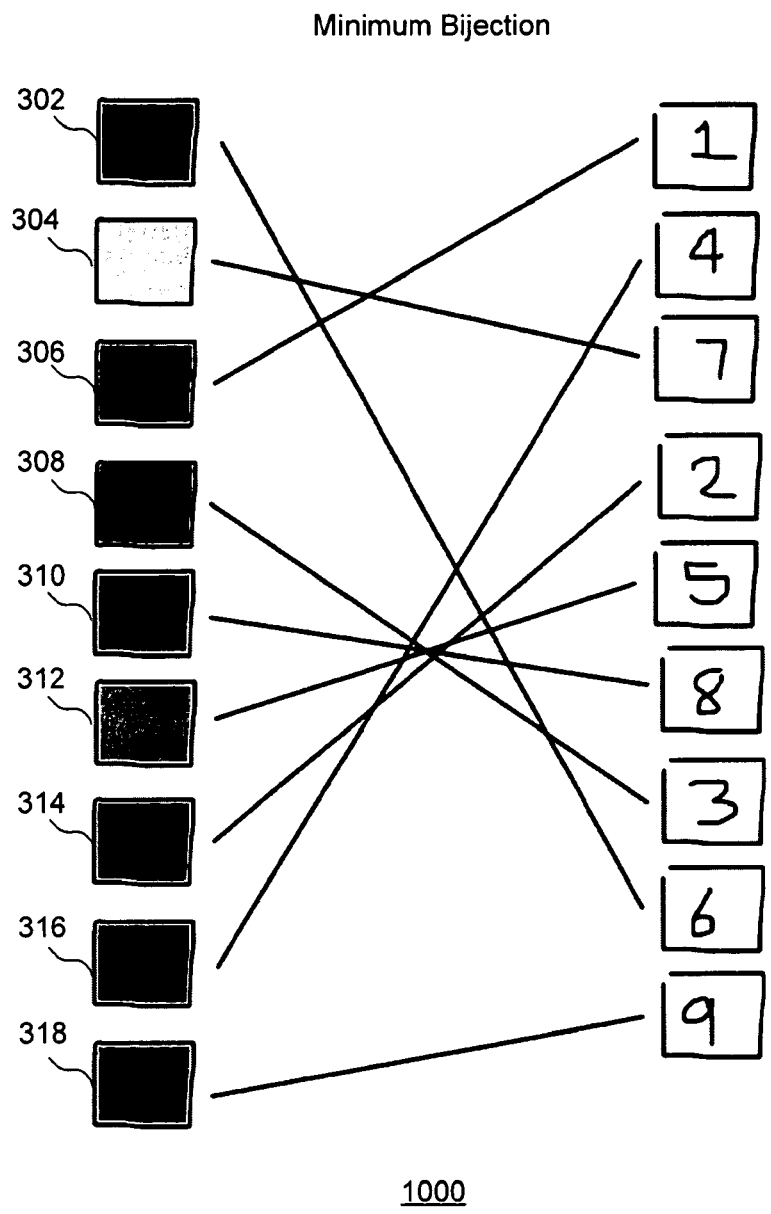
FIG. 10 illustrates an example diagram showing a minimum bijection, according to some implementations.

FIG. 10 illustrates an example diagram showing a minimum bijection 1000, according to some implementations. In some implementations, to compute the minimal bijection of the bipartite graph, system 102 finds a set of edges such that each vertex has a valence (or valency) of one, and where the sum of the edge weights is minimal. In some implementations, the minimal bijection may be solved or approximated by any suitable algorithm, such as a greedy algorithm, or by linear programming, etc. In various implementations, the result of the bijection is an assignment of each input image to a specific discrete grid cell (point).

While implementations have been described in the context of a bipartite graph and a minimum bijection, other ways to achieve the resulting target arrangement from a coarse alignment are possible.

In various implementations, system 102 harmonizes the images in the target arrangement. For example, in some implementations, system 102 harmonizes the color of the images in the target arrangement, and, in particular, harmonizes the colors of each pair of images in the target arrangement. For example, system 102 may harmonize the colors by modifying one or more various color aspects of a given image in order to harmonize those color aspects with corresponding color aspects of each of the adjacent images. Such color aspects may include one or more of hue, shades, tints, tones, value, saturation, luminance, chromaticity, etc. Such color harmonization of images provides a more aesthetically pleasing image layout for users.

In various implementations, system 102 may harmonize each pair of images. In other words, system 102 may harmonize a given image with each of the image's adjacent surrounding image. In various implementations, the overall harmonization processes may be an iterative process as all images in a given arrangement are harmonized. For example, referring again to FIG. 7, system 102 may harmonize color aspects of image 306 to each of images 312, 314, and 316. In various implementations, there may be at least three separate harmonization processes (e.g., between 306 and 312, between 306 and 314, between 306 and 316), each of which having one or more continuous adjustments. System 102 may continuously adjust the harmonization between each of these pairs until all images are harmonized.

Similarly, system 102 may harmonize color aspects of image 318 to each of images 302, 310, and 312. In various implementations, there may be at least three separate harmonization processes (e.g., between 318 and 302, between 318 and 310, between 318 and 312), each of which having one or more continuous adjustments. System 102 may continuously adjust the harmonization between each of these pairs until all images are harmonized. In various implementations, image 312 having been harmonized with image 318 may result in system 102 making further adjustments to image 306 (as well as all other surrounding, adjacent images).

In various implementations, after the images are arranged in the target arrangement based on the 2D arrangement, adjacent images are already relatively close in color and thus relatively harmonized based on relative image placement. System 102 may then further harmonize the images by shifting various color aspects in images relative to color aspects in other images. Due to the target arrangement of the images, the shifting of color aspects between two given images may result in less dramatic changes (e.g., minimized shifting) yet effective changes.

In some implementations, system 102 may split or segment a given image into different portions (e.g., 4 quadrants), and system 102 may weight each portion based on each adjacent image. For example, the colors on the right side of a given image may be weighted to harmonize more with colors of the image to right adjacent side of the given image. In some implementations, system 102 may split or segment a given image based on objects (e.g., individual objects in the background versus, individual objects in the foreground, people versus non-people objects, etc.). In various implementations, system 102 may weight harmonization adjustments based on one or more predetermined harmonization criteria. Such predetermined harmonization criteria may be based on one or more of color aspects, distances between two images, object types in images, etc.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Although the description has been described with respect to particular embodiments thereof, these particular embodiments are merely illustrative, and not restrictive. Concepts illustrated in the examples may be applied to other examples and implementations. For example, implementations may also apply to 1-dimensional arrangements (e.g., as a subset of 2D arrangements). In another example, implementations may also apply to 3-dimensional arrangements (e.g., by first performing a 3D embedding rather than a 2D embedding) to create images arranged inside a cube for example. In some implementations, any distance function can be used to arrange the images, including content-based measures (e.g., objects in the scene such as people, cats, landmarks, etc.), scene categorization (indoor/sunset/landscape/etc.), image quality measures, etc. in addition to the target of color harmony.

While system 102 is described as performing the steps as described in the implementations herein, any suitable component or combination of components of system 102 or any suitable processor or processors associated with system 102 may perform the steps described.

For ease of illustration, various implementations hare described herein in the context of color. As indicated above, implementations described herein may also apply to other image aspects such as content. For example, system 102 may arrange the plurality of images in a 2-dimensional (2D) arrangement based on a predetermined distance function, where the distance function is based on content (e.g., faces or other objects, etc.). In addition to aesthetic reasons as with color, arranging images based on content or may make it easier for a user to find and view particular types of images (e.g., images with people, images with pets, etc.). System 102 may then arrange the images in the target arrangement based on the 2D arrangement.

In various implementations, system 102 may utilize a variety of recognition algorithms to recognize faces, landmarks, objects, etc. in images. Such recognition algorithms may be integral to system 102. System 102 may also access recognition algorithms provided by software that is external to system 102 and that system 102 accesses.

In various implementations, system 102 enables users of the social network system to specify and/or consent to the use of personal information, which may include system 102 using their faces in images or using their identity information in recognizing people identified in images. For example, system 102 may provide users with multiple selections directed to specifying and/or consenting to the use of personal information. For example, selections with regard to specifying and/or consenting may be associated with individual images, all images, individual photo albums, all photo albums, etc. The selections may be implemented in a variety of ways. For example, system 102 may cause buttons or check boxes to be displayed next to various selections. In some implementations, system 102 enables users of the social network to specify and/or consent to the use of using their images for facial recognition in general. Example implementations for recognizing faces and other objects are described in more detail below.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

In various implementations, system 102 obtains reference images of users of the social network system, where each reference image includes an image of a face that is associated with a known user. The user is known, in that system 102 has the user's identity information such as the user's name and other profile information. In some implementations, a reference image may be, for example, a profile image that the user has uploaded. In some implementations, a reference image may be based on a composite of a group of reference images.

In some implementations, to recognize a face in an image, system 102 may compare the face (e.g., image of the face) and match the face to reference images of users of the social network system. Note that the term "face" and the phrase "image of the face" are used interchangeably. For ease of illustration, the recognition of one face is described in some of the example implementations described herein. These implementations may also apply to each face of multiple faces to be recognized.

In some implementations, system 102 may search reference images in order to identify any one or more reference images that are similar to the face in the image. In some implementations, for a given reference image, system 102 may extract features from the image of the face in an image for analysis, and then compare those features to those of one or more reference images. For example, system 102 may analyze the relative position, size, and/or shape of facial features such as eyes, nose, cheekbones, mouth, jaw, etc. In some implementations, system 102 may use data gathered from the analysis to match the face in the image to one more reference images with matching or similar features. In some implementations, system 102 may normalize multiple reference images, and compress face data from those images into a composite representation having information (e.g., facial feature data), and then compare the face in the image to the composite representation for facial recognition.

In some scenarios, the face in the image may be similar to multiple reference images associated with the same user. As such, there would be a high probability that the person associated with the face in the image is the same person associated with the reference images.

In some scenarios, the face in the image may be similar to multiple reference images associated with different users. As such, there would be a moderately high yet decreased probability that the person in the image matches any given person associated with the reference images. To handle such a situation, system 102 may use various types of facial recognition algorithms to narrow the possibilities, ideally down to one best candidate.

For example, in some implementations, to facilitate in facial recognition, system 102 may use geometric facial recognition algorithms, which are based on feature discrimination. System 102 may also use photometric algorithms, which are based on a statistical approach that distills a facial feature into values for comparison. A combination of the geometric and photometric approaches could also be used when comparing the face in the image to one or more references.

Other facial recognition algorithms may be used. For example, system 102 may use facial recognition algorithms that use one or more of principal component analysis, linear discriminate analysis, elastic bunch graph matching, hidden Markov models, and dynamic link matching. It will be appreciated that system 102 may use other known or later developed facial recognition algorithms, techniques, and/or systems.

In some implementations, system 102 may generate an output indicating a likelihood (or probability) that the face in the image matches a given reference image. In some implementations, the output may be represented as a metric (or numerical value) such as a percentage associated with the confidence that the face in the image matches a given reference image. For example, a value of 1.0 may represent 100% confidence of a match. This could occur, for example, when compared images are identical or nearly identical. The value could be lower, for example 0.5 when there is a 50% chance of a match. Other types of outputs are possible. For example, in some implementations, the output may be a confidence score for matching.

For ease of illustration, some example implementations described above have been described in the context of a facial recognition algorithm. Other similar recognition algorithms and/or visual search systems may be used to recognize objects such as landmarks, logos, entities, events, etc. in order to implement implementations described herein.

Implementations described herein provide various benefits. For example, implementations provide more aesthetically pleasing photo album layouts for users. Also, implementations create an arrangement of images that positions closely related images (whether related by color, content, etc.) near one another, and positions distantly related images far from one another.

Figure 11:
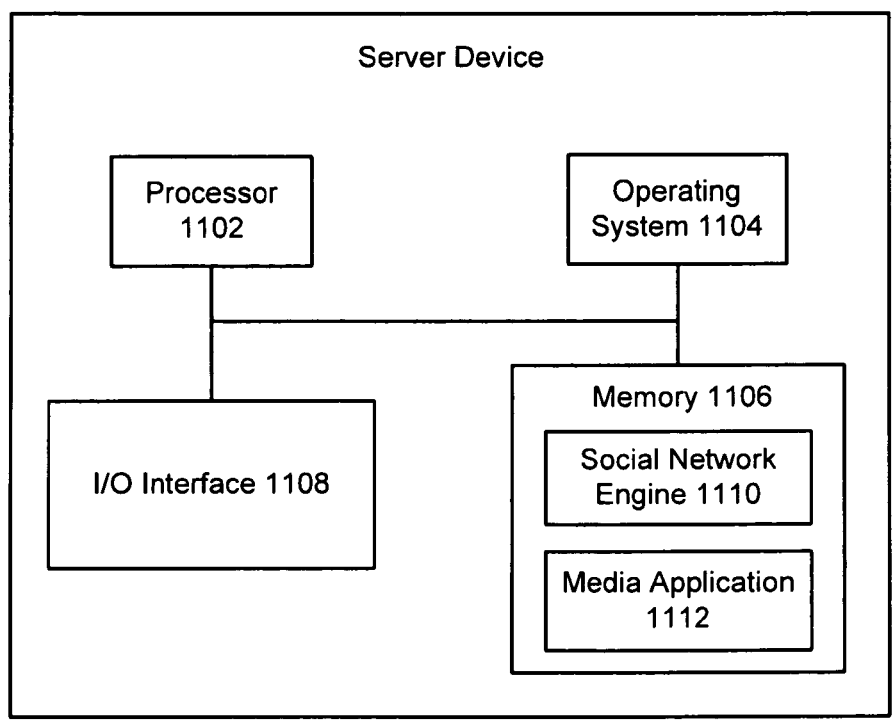
FIG. 11 illustrates a block diagram of an example server device, which may be used to implement the implementations described herein.

FIG. 11 illustrates a block diagram of an example server device 1100, which may be used to implement the implementations described herein. For example, server device 1100 may be used to implement server device 104 of FIG. 1, as well as to perform the method implementations described herein. In some implementations, server device 1100 includes a processor 1102, an operating system 1104, a memory 1106, and an input/output (I/O) interface 1108. Server device 1100 also includes a social network engine 1110 and a media application 1112, which may be stored in memory 1106 or on any other suitable storage location or computer-readable medium. Media application 1112 provides instructions that enable processor 1102 to perform the functions described herein and other functions.

For ease of illustration, FIG. 11 shows one block for each of processor 1102, operating system 1104, memory 1106, I/O interface 1108, social network engine 1110, and media application 1112. These blocks 1102, 1104, 1106, 1108, 1110, and 1112 may represent multiple processors, operating systems, memories, I/O interfaces, social network engines, and media applications. In other implementations, server device 1100 may not have all of the components shown and/or may have other elements including other types of elements instead of, or in addition to, those shown herein.

As indicated above, although the description has been described with respect to particular embodiments thereof, these particular embodiments are merely illustrative, and not restrictive. Concepts illustrated in the examples may be applied to other examples and implementations. For example, some implementations are described herein in the context of a social network system. However, the implementations described herein may apply in contexts other than a social network. For example, implementations may apply locally for an individual user.

Note that the functional blocks, methods, devices, and systems described in the present disclosure may be integrated or divided into different combinations of systems, devices, and functional blocks as would be known to those skilled in the art.

Any suitable programming languages and programming techniques may be used to implement the routines of particular embodiments. Different programming techniques may be employed such as procedural or object-oriented. The routines may execute on a single processing device or multiple processors. Although the steps, operations, or computations may be presented in a specific order, the order may be changed in different particular embodiments. In some particular embodiments, multiple steps shown as sequential in this specification may be performed at the same time.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

What is claimed is:

1. A computer-implemented method, comprising:
   receiving a user's plurality of images for an image collection of the user;
   determining at least one content-based attribute of the user's plurality of images by analyzing content of each of the user's plurality of images;
   determining a target arrangement for the image collection, wherein the target arrangement includes a set of discrete cells;
   generating pairwise distances between pairs of the user's plurality of images based on a distance function associated with the at least one content-based attribute,
   generating a distance graph based on the pairwise distances;
   embedding the distance graph onto an N-dimensional space to create a preliminary arrangement of the user's plurality of images; and
   arranging the user's plurality of images in the image collection in the target arrangement based on the preliminary arrangement.

2. The computer-implemented method of claim 1, wherein the target arrangement is a geometric shape.

3. The computer-implemented method of claim 1, further comprising determining a coarse alignment of the preliminary arrangement, wherein the arranging of the user's plurality of images in the target arrangement is further based on the coarse alignment.

4. The computer-implemented method of claim 3, wherein the arranging of the user's plurality of images in the target arrangement further comprises:
   generating a bipartite graph based on the coarse alignment;
   computing a minimal bijection of the bipartite graph; and
   arranging the user's plurality of images in the target arrangement based on the minimal bijection.

5. The computer-implemented method of claim 1, wherein the preliminary arrangement is a 3-dimensional volume and the target arrangement is a 3-dimensional arrangement.

6. The computer-implemented method of claim 1, wherein the distance graph includes a vertex for each image and edges connecting two vertices, and wherein for S vertices there are $S^2$ edges.

7. The computer-implemented method of claim 1, wherein the user's plurality of images is received from at least one computer device of the user.

8. A system comprising:
one or more processors; and
logic encoded in one or more tangible media for execution by the one or more processors and when executed operable to perform operations comprising:
receiving a user's plurality of images for an image album of the user;
determining a content-based attribute of the user's plurality of images by analyzing content of each of the user's plurality of images;
determining a target arrangement for the image album, wherein the target arrangement includes a grid of discrete cells;
generating pairwise distances between pairs of the user's plurality of images based on a distance function associated with the content-based attribute,
generating a distance graph based on the pairwise distances;
embedding the distance graph onto an N-dimensional space to create a preliminary arrangement of the user's plurality of images; and
arranging the user's plurality of images in the image album of the user in the grid of discrete cells of the target arrangement based on the preliminary arrangement.

9. The system of claim 8, wherein the grid of discrete cells of the target arrangement is in a form of a geometric shape.

10. The system of claim 8, wherein the operations further comprise determining a coarse alignment of the preliminary arrangement, wherein the arranging of the user's plurality of images in the target arrangement is further based on the coarse alignment.

11. The system of claim 10, wherein the arranging of the user's plurality of images in the target arrangement further comprises:
generating a bipartite graph based on the coarse alignment;
computing a minimal bijection of the bipartite graph; and
arranging the user's plurality of images in the target arrangement based on the minimal bijection.

12. The system of claim 8, wherein the preliminary arrangement is a 2-dimensional plane and the target arrangement is a 2-dimensional (2D) arrangement.

13. The system of claim 8, wherein the preliminary arrangement is a 3-dimensional volume and the target arrangement is a 3-dimensional arrangement.

14. The system of claim 8, wherein the distance graph includes a vertex for each image and edges connecting two vertices, and wherein for S vertices there are $S^2$ edges.

15. A non-transitory computer-readable storage medium having stored thereon software instructions that, when executed by a processor, cause the processor to perform operations including:
receiving a user's plurality of images for an image collection of the user;
determining a content-based attribute of a plurality of images by analyzing content of each of the user's plurality of images;
determining a target arrangement for the image collection, wherein the target arrangement includes a set of discrete cells;
generating pairwise distances between pairs of the user's plurality of images based on a distance function associated with the content-based attribute,
generating a distance graph based on the pairwise distances;
embedding the distance graph onto an N-dimensional space to create a preliminary arrangement of the user's plurality of images; and
arranging the user's plurality of images in the image collection in the target arrangement based on the preliminary arrangement.

16. The non-transitory computer-readable storage medium of claim 15, wherein the target arrangement is a geometric shape.

17. The non-transitory computer-readable storage medium of claim 15, further comprising determining a coarse alignment of the preliminary arrangement, wherein the arranging of the user's plurality of images in the target arrangement is further based on the coarse alignment.

18. The non-transitory computer-readable storage medium of claim 15, wherein the preliminary arrangement is a 2-dimensional plane and the target arrangement is a 2-dimensional (2D) arrangement.

19. The non-transitory computer-readable storage medium of claim 15, wherein the preliminary arrangement is a 3-dimensional volume and the target arrangement is a 3-dimensional arrangement.

20. The non-transitory computer-readable storage medium of claim 15, wherein the distance graph includes a vertex for each image and edges connecting two vertices, and wherein for S vertices there are $S^2$ edges.

* * * * *